Oct. 26, 1965 A. B. TURNER 3,214,719

THERMISTOR DEVICE

Filed March 20, 1964

2 Sheets-Sheet 1

WITNESSES

Theodore F. Wrobel

James F. Young

INVENTOR

Abner B. Turner

BY

C. L. Menzemer

ATTORNEY

Oct. 26, 1965

A. B. TURNER 3,214,719

THERMISTOR DEVICE

Filed March 20, 1964

2 Sheets-Sheet 2

United States Patent Office 3,214,719
Patented Oct. 26, 1965

3,214,719
THERMISTOR DEVICE

Abner B. Turner, Greensburg, Pa., assignor to Westinghouse Electric Corporation, Pittsburgh, Pa., a corporation of Pennsylvania Filed Mar. 20, 1964, Ser. No. 353,514
4 Claims. (Cl. 338—22)

This invention relates to electrical components that are provided with wire leads, and more particularly to the attachment of the leads to the conductive body of the component.

Heretofore, the principal way of fastening leads to electrical components, such as resistors and the like, has been to solder the leads to the conductive body or to embed one end of the lead in the body.

The second method becomes out of the question when the conductive body is too small to receive the lead, while soldering has many objections, including cost. Also when the component is very small, the solder joint may be larger than the component.

It is an object of this invention to provide an electrical component, in which electrical leads are affixed to a conductive body without the use of solder, embedding or metal fastener elements.

Another object of the present invention is to provide a means for making electrical contact to a body of a thermistor material by holding electrical leads in contact with the body of thermistor material with a heat shrunk material.

A further object of the invention is to provide a thermistor device with a quicker response.

A still further object of the invention is to provide a thermistor with an improved lifetime.

Other objects will be obvious and will appear hereinafter.

For a more complete understanding of the objects and nature of the present invention, reference should be made to the detailed explanation and drawings in which.

In accordance with the present invention and attainment of the foregoing objects there is provided a process for affixing electrical leads to a body of electrically conductive material comprising holding at least one electrically conductive lead in contact with a body of an electrically conductive material with a loosely fitting heat shrinkable dielectric flexible sleeve, and shrinking said sleeve by heating whereby the electrical lead is held in an electrically conductive relationship with said body of electrically conductive material.

It is another aspect of this invention to provide a thermistor having an improved response time and lifetime in which at least one electrically conductive lead is held in an electrically conductive relationship with a body of thermistor material by a sleeve of a heat shrunk dielectric material.

As used in this specification and claims thermistor material refers to and means (1) an electrically conductive material the resistance of which either greatly increases as the temperature of the material increases until at a certain temperature the material for all intents and purposes is an electrical insulator or (2) a material whose resistance decreases with an increase in current so that for all intents and purposes at a certain temperature the material shifts from essentially an insulator to a conductor.

The first material is used in making Positive Temperature Coefficient thermistor devices (PTC) and the second material is used to fabricate Negative Temperature Coefficient (NTC) devices.

Figures 1, 2:
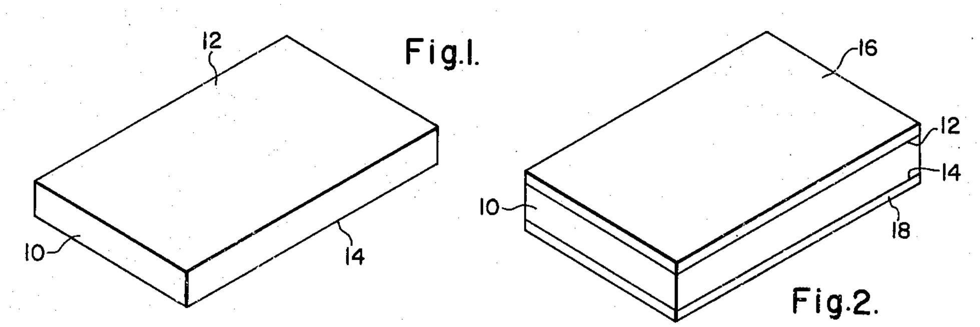
FIGURE 1 is a perspective view of a body of thermistor material.
FIG. 2 is a perspective view of the body of FIG. 1 undergoing processing in accordance with the teachings of this invention.

More specifically, and with reference to FIG. 1, there is shown a body 10 of a thermistor material such for example, as barium titanate, and the materials set forth in U.S. Patents 2,976,505, 2,981,699. The teachings of this invention are equally applicable to Positive Temperature Coefficient materials (PTC), Negative Temperature Coefficient materials (NTC) and resistor materials.

The body 10 has oppositely opposed major surfaces 12 and 14. While the body 10 has been shown to be rectangular in FIG. 1, it will of course be realized that the shape is not important and that the body 10 may be of any suitable configuration.

With reference to FIG. 2 metallic coatings 16 and 18 are applied to surfaces 12 and 14 respectively.

The metallic coatings may be applied by any suitable method known to those skilled in the art such as by spraying, vapor deposition, chemical deposition and the like.

The metallic coatings 16 and 18 may be comprised of any electrically conductive metal having a melting point above the operating temperature of the finished electrical device such as copper, tin, aluminum, silver, lead, indium alloys thereof and the like.

Figure 3:
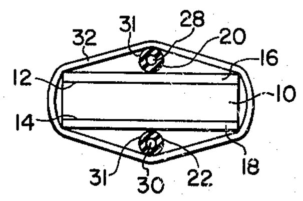
FIG. 3 is an end view of the body of FIG. 1 undergoing further treatment.
Figure 4:
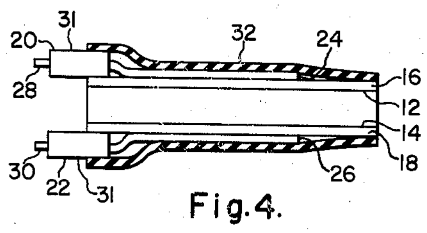
FIG. 4 is a side view in cross-section of the body of FIG. 1 with electrical leads attached in accordance with the teachings of this invention.

With reference to FIGS. 3 and 4, metallic electrical leads 20 and 22 are positioned in contact with metallic coatings 16 and 18 respectively. Ends 24 and 26 of electrical leads 20 and 22 respectively are in contact with the metaallic coatings 16 and 18 respectively and ends 28 and 30 of electrical leads 20 and 22 extend beyond the parameter of the body 10. It will be understood of course any insulation such as insulating coating 31 is removed from that part of leads 20 and 22 in contact with the metallic coatings 16 and 18.

A sleeve 32 holds the electrical leads 20 and 22 in contact with the metallic coatings 16 and 18 respectively.

The sleeve 32 is comprised of any suitable heat-shrinkable, dielectric resinous material such as polyethylene terephthalate, sold commercially under the trademark Mylar, polytetrafluoroethylene, sold under the trademark Teflon, trifluorochloroethylene, sold under the trademark Kel-F, and polyolefins such as that sold under the trademark Rayclad.

The sleeve 32 fits about the body 10 and leads 20 and 22 just tightly enough to hold the leads 20 and 22 in contact with the metal coatings 16 and 18.

Figure 5:
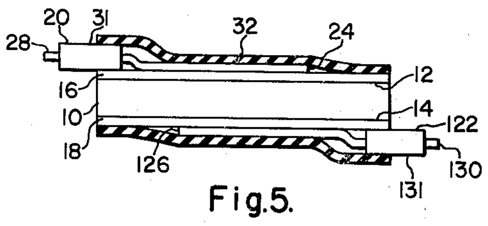
FIG. 5 is a side view in cross-section of the body of FIG. 4 undergoing further processing in accordance with the teachings of this invention.

It should be understood that while in FIG. 4 both electrical leads 20 and 22 are shown extending from the same end of body 10, the leads may also be positioned in such a manner as to extend from opposite ends of the body 10. This configuration is shown in FIG. 5 and is the same as that shown in FIG. 4 except that lead 122 extends from the opposite end of body 10 than lead 20. Lead 22 consists of a conductor 130, and an insulation 122 disposed about the conductor. End 126 of the conductor 130 is held in place against metal coating 18.

Referring again to FIG. 4, the assembly consisting of body 10, electrical leads 20 and 22 and sleeve 32 is then passed through a furnace or heated by other suitable means to shrink the sleeve 32 whereby the leads 20 and 22 are held in intimate and good electrical conductive relationship with the metallic coatings 16 and 18 on surfaces 12 and 14 of the body 10.

Figure 6:
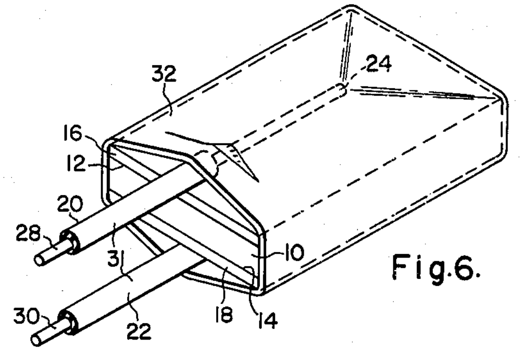
FIG. 6, 7 and 8 are perspective views of a thermistor device prepared in accordance with the teachings of this invention.

The resultant assembly is shown in FIG. 6.

The unit thus produced and shown either in FIGS. 4 or 5 may then be potted or sealed to protect it from any deleterious effect of the environment in which it is employed.

The unit of either FIGS. 4 or 5 may be potted or sealed in a suitable resin such for example as an epoxy resin, a silicone resin, polyester resin or mixtures and combinations thereof.

The potting or sealing resin should be moisture proof and a dielectric.

Figure 7:
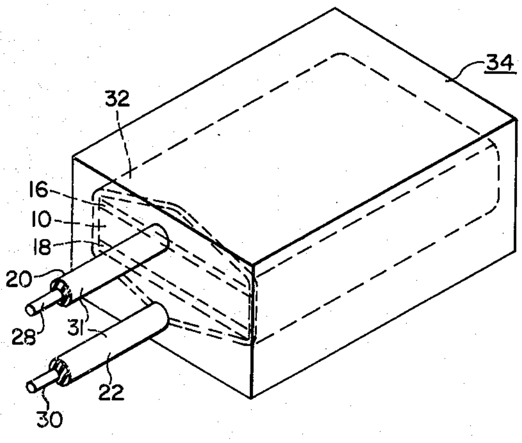
Figure 8:
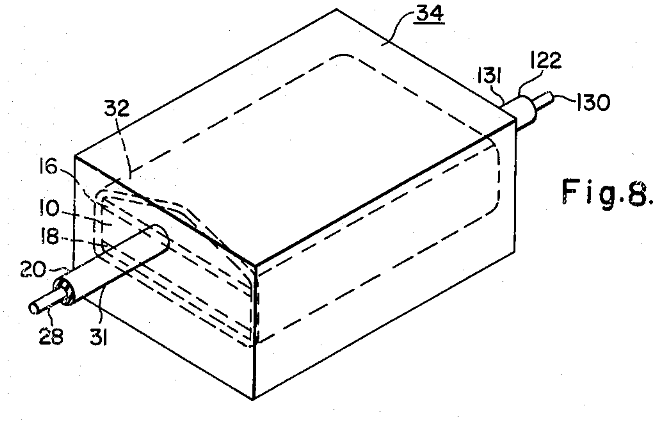

The units of FIG. 4 and FIG. 5 are shown in FIGS. 7 and 8 respectively with a coating 34 and 36 respectively of a suitable resin completely surrounding and sealing them.

In each case the coating may be applied by any method known to those skilled in the art such as by dipping, spraying, painting and the like. The coating is then cured by heating.

The following examples are illustrative of the teachings of this invention.

The barium titanate material used in fabricating the thermistor devices of the examples was prepared in accordance with the procedures and teachings of U.S. Patent 2,976,505.

*Example I*

A PTC thermistor was prepared in the following manner using a body of barium titanate having the following dimensions, 0.375 inch x 0.125 inch x 0.020 inch.

A five mils thick coating of an alloy consisting of, by weight, 93% lead, 2% silver and 5% indium was sprayed onto the two .375 inch x .125 inch surfaces.

Approximately .25 inch of insulation was removed from two pieces of 22 gauge polytetrafluoroethylene insulated tinned copper wire.

The bare portion of the tinned copper wire was positioned against the bismuth-indium coating one wire on each surface of the body of barium titanate, and the remaining wire allowed to extend beyond the body of barium titanate in the same direction.

A loose fitting sleeve of polyethylene terephthalate was slipped over the body of barium titanate and leads. The sleeve held the wires in contact with the metal coatings on the barium titanate.

The assembly was heated in a furnace for approximately two minutes at 150° C. during which time the polyethylene terephthalate sleeve shrunk and pressed the wires more firmly against the metal coating deposited on the barium titanate body. The sleeve underwent approximately 20% shrinkage during heating.

The assembly was then dipped in a liquid resinous composition comprised of 100 parts by weight of a liquid epoxy having an epoxy equivalent weight of from 190 to 210, and sold under the trade name Epon 828, and 5 parts by weight piperidine.

The coated assembly was then heated for two hours at 90° C. to cure the epoxy resin coating.

*Example II*

The procedure of Example I was repeated except that the lead wires extended in opposite directions from the body of barium titanate.

*Example III*

The thermistors of Examples I and II were tested to determine switching temperature, resistance at various temperatures, dissipation constant in free air and thermal time constant and found to be substantially identical.

The data gave conclusive proof that the properties of the thermistor are not influenced by which direction the leads extend from the body of thermistor material.

*Example IV*

A body of barium titanate prepared from the same batch as that used for Examples I and II and having the same dimensions as the bodies of Examples I and II was used in this example.

The two .375 x .125 surfaces were coated by spraying with an alloy consisting of, by weight, 93% lead, 2% silver and 5% indium. The coating as in Examples I and II was five mils thick.

Contacts were affixed to the coated surfaces of the barium titanate body by soldering a 22 gauge polytetrafluoroethylene insulated tinned copper wire to each of the coated surfaces. The contacts were soldered by employing the same alloy as was used for the coating for the solder, to wit; by weight 93% lead, 2% silver and 5% indium.

The contacts extended from the body of barium titanate in opposite directions.

The assembly was then encapsulated in the same epoxy resin compound as used in Examples I and II.

*Example V*

The procedure of Example IV was followed employing the same materials, and in addition after soldering the leads to the body of barium titanate, a sleeve of polyethylene terephthalate was heat shrunk about the assembly as in Example I.

*Example VI*

A life test was determined using the four samples prepared in Examples I, II, IV and V.

The life test conducted was that accepted by industry, to wit; the determination of the ability to maintain its original room temperature resistance after repeated thermal cycling.

The thermal cycling was accomplished by (1) immersing the device in an oil bath at 130° C. (2) removing the device from the bath, (3) allowing it to cool to room temperature and (4) determining the D.C. resistance of the device at room temperature.

Figure 9:
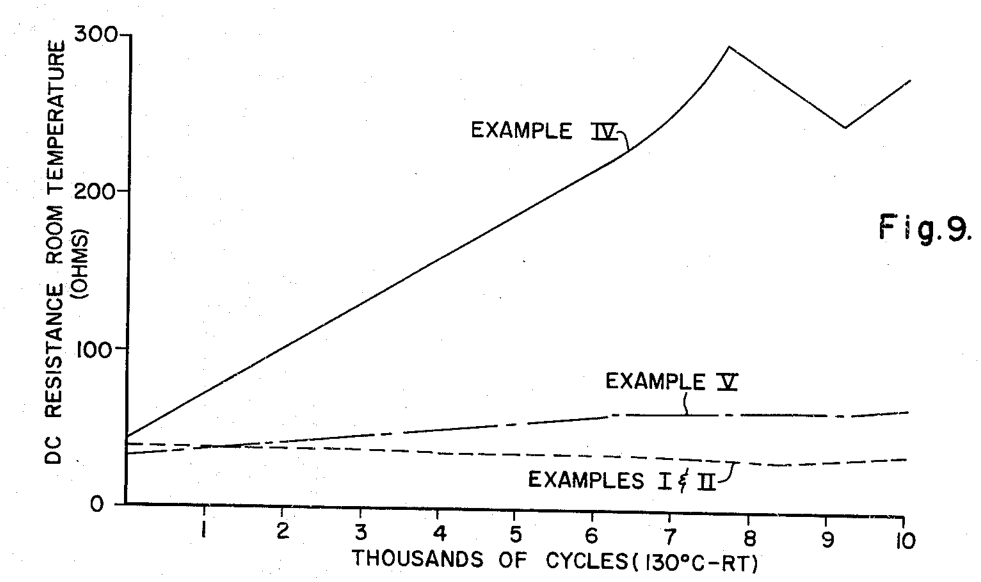
FIG. 9 is a graphical presentation of lifetime data comparing a device prepared in accordance with the teachings of this invention and prior art devices.

The data is presented graphically in FIG. 9.

From FIG. 9 it can be seen that lifetime is not effected by which direction the leads extend from the body.

More important and completely unexpected is the fact that devices prepared in accordance with the teachings of this invention have an almost indefinite lifetime and their lifetime (as measured by their ability to maintain a constant room temperature resistance after thermal cycling) is far superior to devices in which the electrical leads have been soldered to the body of thermistor material.

Since the primary function of a thermistor in an electrical circuit is to protect electrical equipment from damage as a result of an unexpected surge in current, the time in which the resistance of a thermistor goes from zero or a constant known quantity at room temperature or normal circuit operating temperature to a greatly increased resistance is of the utmost importance. The measurement of this property in devices prepared in accordance with this invention and the comparison with devices in which the leads were soldered to the thermistor material gave a total unexpected result and further illustrates the advantages resulting from the teachings of this invention.

The resistance of barium titanate thermistors is known to be 800 ohm at 125° C. These facts were utilized in determining response time in the following manner.

A thermistor was connected in a series circuit relationship with a micro-switch, a relay, a clock and a power source. The thermistor was positioned approximately one inch above an oil bath at a temperature of 125° C.

The circuit components were so correlated that current to the clock would stop when the resistance of the thermistor reached 800 ohms.

The thermistor was allowed to free fall the approximately one inch into the oil bath and in so doing tripped the micro-switch and current flowed to the clock.

The thermistors prepared in accordance with Examples I and II were from room temperature resistance to a resistance of 800 ohms, thereby shutting off the clock, in an average time of 10 seconds.

The thermistors of Examples IV and V averaged between 15 seconds and 20 seconds.

A commercially available thermistor comprised of a barium titanate body of the same size as that used in preparing Examples I and II but in which the electrical leads are first soldered to a wafer of stainless steel and the stainless steel is then soldered to the barium titanate body averaged 60 seconds to 90 seconds in the same test.

The above tests were run with thermistor devices prepared in accordance with the teachings of this invention employing other thermistor materials and such devices were found to have equally improved properties.

While the invention has been described with reference to particular embodiments and examples it will be understood, of course, that modifications, substitutions and the like may be made without departing from its scope.

I claim as my invention:

1. A thermistor device comprising a body of thermistor material, said body of thermistor material having oppositely opposed major surfaces, an electrically conductive metal coating disposed on each of the oppositely opposed major surfaces, an electrical lead in electrical contact relationship with each of said electrically conductive metal coatings and extending therefrom, a body of heat shrunk dielectric material surrounding said body of thermistor material and said leads, said body of heat shrunk dielectric material holding said electrical leads in electrical contact relationship with said body of thermistor material through said coating.

2. A thermistor device comprising a body of thermistor material, an electrically conductive coating disposed on two opposite surfaces of said body and in an electrically conductive relationship with said body and extending therefrom, said coating consisting of at least one metal selected from the group consisting of copper, tin, aluminum, silver, lead, indium and alloys thereof, an electrically conductive lead in a direct electrically conductive relationship with each of said coatings, a heat shrunk resinous sleeve surrounding said body and said leads, said sleeve holding said leads in an electrically conductive relationship with said body through said coating.

3. A thermistor device comprising a body of thermistor material, an electrically conductive coating disposed on two opposite surfaces of said body and in an electrically conductive relationship with said body and extending therefrom, said coating consisting of at least one metal selected from the group consisting of copper, tin, aluminum, silver, lead, indium and alloys thereof, an electrically conductive lead in a direct electrically conductive relationship with each of said coatings, a heat shrunk resinous sleeve surrounding said body and said leads, said sleeve holding said leads in an electrically conductive relationship with said body through said coating, said sleeve being comprised of a resinous material selected from the group consisting of polyethylene terephthalate, polytetrafluoroethylene, trifluorochloroethylene and polyolefins.

4. A thermistor device comprising a body of thermistor material, an electrically conductive coating disposed on two opposite surfaces of said body and in an electrically conductive relationship with said body and extending therefrom, said coating consisting of at least one metal selected from the group consisting of copper, tin, aluminum, silver, lead, indium and alloys thereof, an electrically conductive lead in a direct electrically conductive relationship with each of said coatings, a heat shrunk resinous sleeve surrounding said body and said leads, said sleeve holding said leads in an electrically conductive relationship with said body through said coating, said sleeve being comprised of a resinous material selected from the group consisting of polyethylene terephthalate, polytetrafluoroethylene, trifluorochloroethylene and polyolefins and a cured coating of a resinous material completely surrounding said body of thermistor material, leads and sleeve except for the extremities of the leads extending from the body of thermistor material.

References Cited by the Examiner

UNITED STATES PATENTS

| | | | |
|---|---|---|---|
| 2,253,577 | 8/41 | Pearson et al. | 338—23 |
| 2,278,072 | 3/42 | Gould et al. | 338—328 |
| 2,462,162 | 2/49 | Christensen et al. | 338—22 X |
| 2,737,618 | 3/56 | Eisler | 264—272 X |
| 2,863,132 | 12/58 | Sowa. | |
| 3,063,100 | 11/62 | Kohring | 264—342 X |
| 3,093,448 | 6/63 | Kirkpatrick | 264—272 |

RICHARD M. WOOD, *Primary Examiner.*

ANTHONY BARTIS, *Examiner.*